United States Patent
Tan et al.

(10) Patent No.: US 7,349,978 B2
(45) Date of Patent: Mar. 25, 2008

(54) SPURIOUS TIMEOUT DETECTION IN TCP BASED NETWORKS

(75) Inventors: Kun Tan, Beijing (CN); Hongbin Liao, Beijing (CN); Chuanxiong Guo, Nanjing (CN); Qian Zhang, Beijing (CN); Wenwu Zhu, Basking Ridge, NJ (US)

(73) Assignee: Microsoft Corporation, Redmond, WA (US)

( * ) Notice: Subject to any disclaimer, the term of this patent is extended or adjusted under 35 U.S.C. 154(b) by 953 days.

(21) Appl. No.: 10/758,510

(22) Filed: Jan. 15, 2004

(65) Prior Publication Data

US 2005/0198350 A1    Sep. 8, 2005

(51) Int. Cl.
G06F 15/16    (2006.01)

(52) U.S. Cl. .................. 709/237; 709/223; 709/231; 709/235; 370/230; 370/235

(58) Field of Classification Search ........ 709/223–224, 709/231–232, 234–235, 237; 714/746–751; 370/229–235, 252

See application file for complete search history.

(56) References Cited

U.S. PATENT DOCUMENTS

| | | | |
|---|---|---|---|
| 5,872,777 A * | 2/1999 | Brailean et al. | 370/349 |
| 6,233,615 B1 * | 5/2001 | Van Loo | 709/224 |
| 6,747,949 B1 * | 6/2004 | Futral | 370/231 |
| 6,757,248 B1 * | 6/2004 | Li et al. | 370/235 |
| 7,065,482 B2 * | 6/2006 | Shorey et al. | 709/224 |
| 2003/0135640 A1 * | 7/2003 | Ho et al. | 709/237 |

OTHER PUBLICATIONS

Balakrishnan, Hari et al., "Improving TCP/IP Performance over Wireless Networks", *In Proceedings of the 1st ACM International Conference on Mobile Computing and Networking (Mobicom)*, Nov. 1995, 10 pages total.

Fu, Shaojian et al., Modelling TCP Reno with Spurious Timeouts in Wireless Mobile Environmnet, *In Proceedings of the 12th International Conference on Computer Communications and Networks*, Oct. 20-22, 2003 pp. 1-10.

(Continued)

*Primary Examiner*—Bharat Barot
(74) *Attorney, Agent, or Firm*—Lee & Hayes, PLLC

(57) ABSTRACT

A method for detecting a spurious timeout in a TCP network which can be used to avoid unnecessarily triggering the TCP rate adaptation is disclosed. Upon detection of a timeout on a given packet, a shortened packet version of the possibly lost packet is retransmitted. The retransmitted packet is at least one byte shorter than the original packet. The node receiving this retransmitted packet will acknowledge the receipt of the packet as specified in the TCP protocol. The acknowledgment will contain the sequence number of the lowest byte the receiving node has not yet received. Because the retransmitted packet is shorter than the original packet, the sequence number of this as yet not received byte will be less than or equal to the last byte of the original packet if the original packet was not received indicating a valid timeout. If the sequence number in the acknowledgment is greater than the last byte of the original packet than the original packet was received correctly and the timeout was caused by a lost acknowledgment and is considered a spurious timeout. In the case of a spurious timeout the congestion control mechanisms in the TCP protocol need not be used.

27 Claims, 6 Drawing Sheets

OTHER PUBLICATIONS

Blanton, Ethan, et al.; Internet Engineering Task Force, "Using TCP DSACKs and SCTP Duplicate TSNs to Detect Spurious Retransmissions," Oct. 2002, 6 pages.

Ludwig, R., et al., "The Eifel Detection Algorithm for TCP," Network Working Group, Apr. 2003, 14 pages.

Jacobson, V., et al., "TCP Extensions for High Performance," Network Working Group, May 1992, 37 pages.

Swami, Y., et al., "DCLOR: De-correlated Loss Recovery Using SACK Option for Spurious Timeouts," Internet Engineering Task Force, Apr. 2003, 10 pages.

Floyd, S., et al., "An Extension to the Selective Acknowledgement (SACK) Option for TCP," Network Working Group, 17 pages, no date.

Sarolahti, P., et al., "F-RTO: An Algorithm for Detecting Spurious Retransmission Timeouts with TCP and SCTP," Internet Engineering Task Force, Jun. 2003, 17 pages.

De Graaf, K., et al., "Definitions of Managed Objects for IEEE 802.3 Repeater Devices Using SMIv2," Network Working Group, Feb. 1997, 82 pages.

* cited by examiner

SPURIOUS TIMEOUT DETECTION IN TCP BASED NETWORKS

FIELD OF THE INVENTION

This invention relates generally to computer systems and, more particularly, relates to improving the throughput of the TCP protocol.

BACKGROUND OF THE INVENTION

The use of transmission control protocol (TCP) over wireless networks has become increasingly common. It is common today for data transported using TCP to be carried over several different types of wireless networks including cellular networks and short range wireless networks such as the 802.11 standards, HomeRF, and Bluetooth.

TCP/IP attempts to assure that every packet transmitted between two nodes reaches the proper destination. To do so, TCP sender requires the receiving node to send an acknowledgment when a packet is properly received. If the sending node does not receive an acknowledgment within a predetermined period of time, the sending node retransmits the packet.

TCP has been designed with wired networks in mind. In this situation, packet losses are mostly because of network congestion, in which case the buffers on router become fully accumulated such that further incoming packets are simply discarded. TCP senders must react to network congestions by decreasing the sending rate in order to keep the network stable and efficient.

To detect a packet loss, a TCP sender exploits two methods, referred to as Retransmission Timeout (RTO) and Fast Retransmission. The former method sets a timer after a transmission. When the timer expires and a TCP sender does not receive the acknowledgement for that packet, a loss is detected. In the latter method, a TCP sender monitors a so-called duplicated ACK (DupACK) which can be caused by packet loss or re-ordering. However, if a significant number of DupACKs are received, it is very likely that a packet is lost and a TCP sender should retransmit immediately.

The calculation of TCP Retransmission Timeout is very crucial to avoid causing premature timeouts which can greatly decrease TCP's throughput. The current standard TCP RTO calculation works well in wired network. However, adequate evidence shows that in some wireless environments, the retransmission timer can expire prematurely and trigger unnecessary retransmissions when there is actually no segment loss. This sort of timeout is called a spurious timeout. The causes for spurious timeouts in such wireless networks are various. For example, in some slow wireless networks, e.g. GPRS, arrival of competing traffic with higher priority may involve a sudden decrease of bandwidth of a data channel. The sudden decrease can result in a spurious retransmission timeout. Additionally, a persistently reliable wireless link layer will retransmit a data packet several times if the radio conditions are bad. Thus, the TCP sender may time-out. Moreover, a busy reverse channel can also cause spurious timeouts because the receiver can not send back ACKs in time.

Spurious timeouts harm TCP performance in at least two ways. First, since the timeout is caused merely by the network delay and there is actually no congestion, TCP's congestion control, i.e., reducing the sending rate, is unnecessarily triggered. Second, TCP senders cannot distinguish ACKs generated by the original transmission or the retransmission. Rather, senders blindly enter a go-back-N retransmission of the whole window's worth of data even though these data have already been received. This wastes bandwidth. Therefore, a need exists to detect these spurious timeouts in a TCP network with wireless links. If a TCP sender is able to detect whether or not a timeout fires spuriously, then appropriate responses can be provided. For example, a TCP sender could reduce the sending rate if packets are lost, while keeping the rate unchanged if the timeout is a spurious one.

BRIEF SUMMARY OF THE INVENTION

The invention is directed to detecting spurious timeouts using mechanisms provided by the TCP protocol. The detection of a spurious timeout begins when the time out period is reached and a transmitted packet has not been acknowledged. At this point the sending node retransmits a part of the lost packet. The retransmitted packet starts with the same byte as the lost packet and continues sequentially through the bytes of the lost packet. The retransmitted packet so formed continues to include at most the next to last byte in the lost packet. If the original packet was truly lost, the receiving node will acknowledge the retransmitted packet and indicate that the last byte of the potentially lost packet has not been received. However, if the potentially lost packet timeout was caused by a spurious timeout, the receiving node, having received the last byte of the potentially lost packet, will send an acknowledgment number higher than that of the last byte of the potentially lost packet.

BRIEF DESCRIPTION OF THE DRAWINGS

While the appended claims set forth the features of the present invention with particularity, the invention, together with its objects and advantages, can be best understood from the following detailed description taken in conjunction with the accompanying drawings of which:

DETAILED DESCRIPTION OF THE INVENTION

Figure 1:
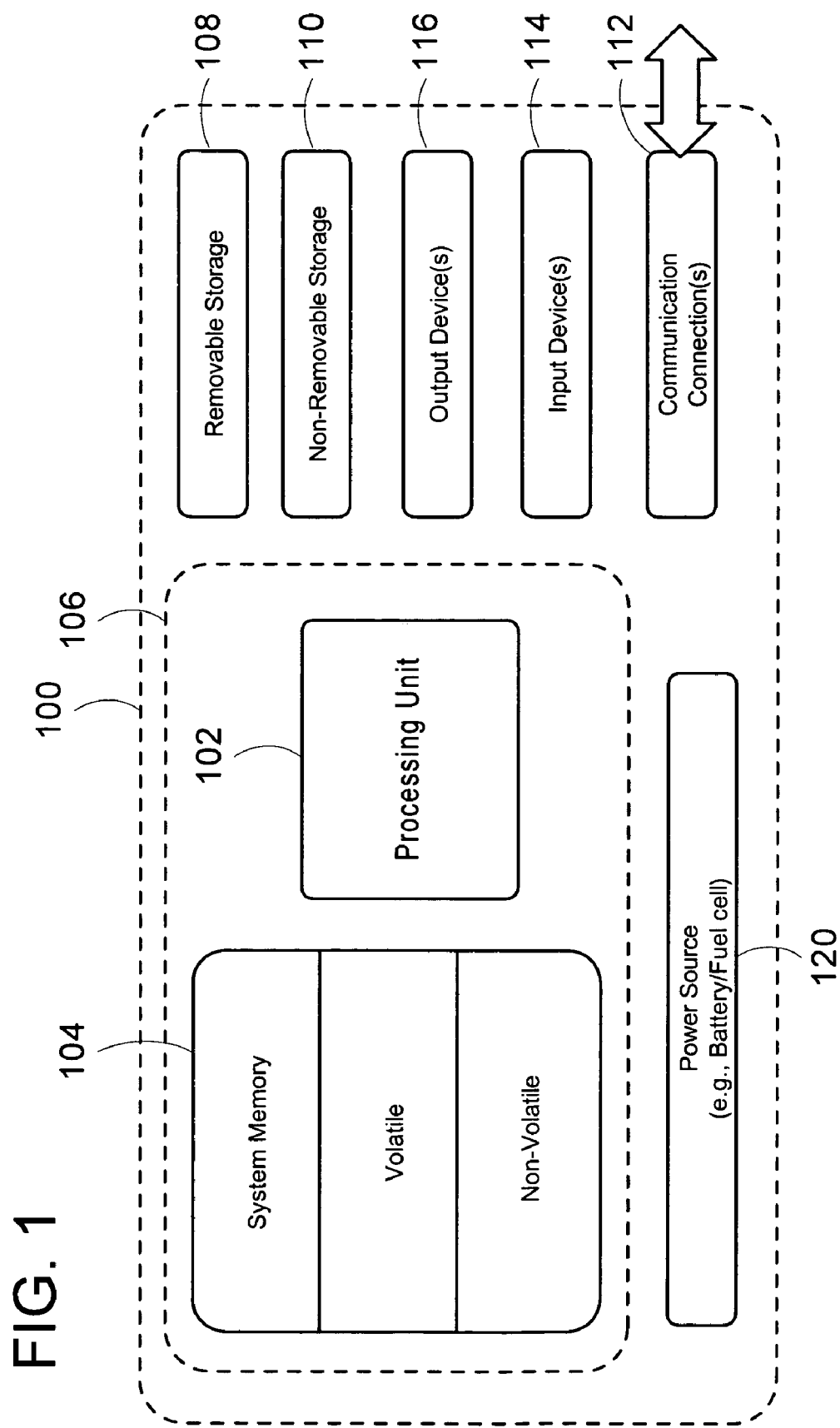
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

The invention may be implemented in a system employing various types of machines, including cell phones, hand-held devices, wireless surveillance devices, microprocessor-based programmable consumer electronics, and the like, using instructions, such as program modules, that are executed by a processor. Generally, program modules include routines, objects, components, data structures and the like that perform particular tasks or implement particular abstract data types. The term "program" includes one or more program modules.

FIG. 1 shows an exemplary computing device 100 for implementing one or more embodiments of the invention. In its most basic configuration, the computing device 100 includes at least a processing unit 102 and a memory 104. Depending on the exact configuration and type of computing device, the memory 104 may be volatile (such as RAM), non-volatile (such as ROM, flash memory, etc.) or some combination of the two. The basic configuration is illustrated in FIG. 1 by a dashed line 106. Additionally, the device 100 may also have additional features/functionality. For example, the device 100 may also include additional storage (removable and/or non-removable) including, but not limited to, magnetic or optical disks or tapes. Such additional storage is illustrated in FIG. 1 by a removable storage 108 and a non-removable storage 110. Computer storage media includes volatile and nonvolatile, removable and non-removable media implemented in any method or technology for storage of information such as computer readable instructions, data structures, program modules or other data. The memory 104, the removable storage 108 and the non-removable storage 110 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by the device 100. Any such computer storage media may be part of the device 100.

Device 100 may also contain one or more communications connections 112 that allow the device to communicate with other devices. The communications connections 112 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

Device 100 may also have one or more input devices 114 such as keyboard, mouse, pen, voice input device, touch-input device, etc. One or more output devices 116 such as a display, speakers, printer, etc. may also be included. All these devices are well known in the art and need not be discussed at greater length here.

In keeping with the intended application of the invention, device 100 is configured as a wireless mobile device. To that end, device 100 is provided with a portable power source 120, such as a battery pack, a fuel cell, or the like. The power source 120 provides power for computations and wireless data transmissions by the device 100.

Figure 2:
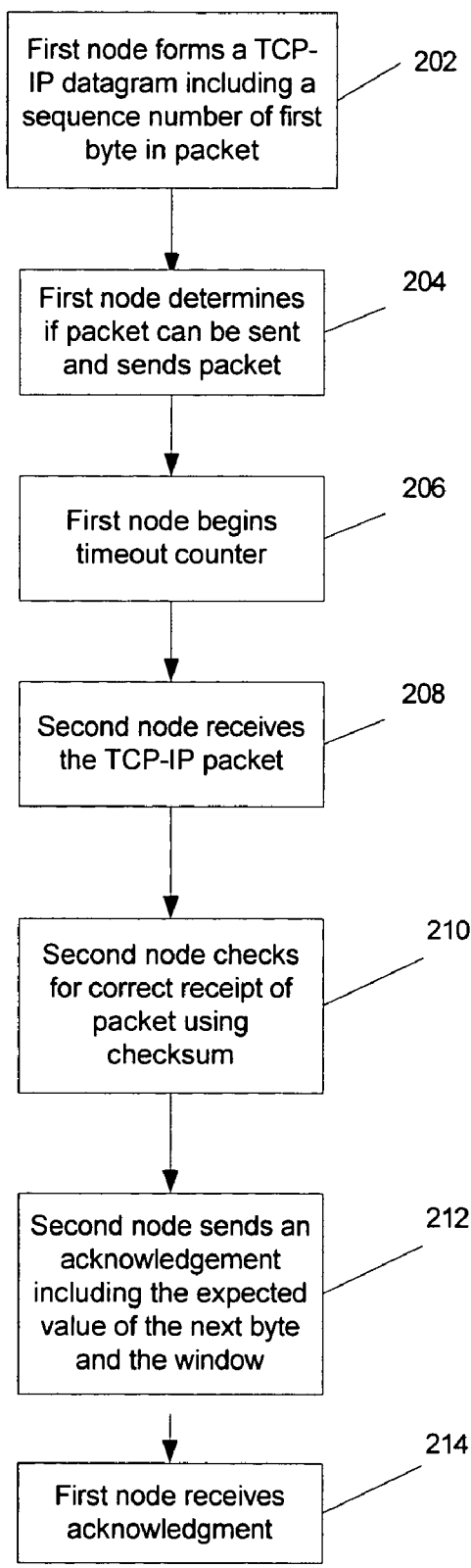
FIG. 2 is a flow diagram of a typical TCP-IP transfer.

Referring to FIG. 2, a typical TCP data transaction is shown. In block 202 the first node forms a TCP packet. The packet consists of a header detailed further in Table 1 and a payload section which contains the data to be transferred. In block 204 the first node determines if the second node has indicated that the packet can be sent. This determination is made using the window and acknowledgment number fields in the TCP header and will be explained in more detail below. In block 204, it is assumed that the conditions are such that the packet can be sent. Block 206 provides that the first node starts a counter coincident with the sending of the packet which starts from a predefined value and counts down. In block 208, the packet is received by the second node. Block 210 provides that the second node checks that the packet was received correctly using the checksum included in each packet. In block 212, it is assumed that the packet was received correctly and the second node sends an acknowledgment. Block 214 provides that the first node receives the acknowledgment prior to the timer started in step 206 reaching 0. If the first node does not receive an acknowledgment before the timer expires the first node will assume that the packet was not successfully received by the second node and will transmit the packet again.

TABLE 1

The TCP header.

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |          Source Port          |       Destination Port        |
   +-+-+-+-+-+-+-+-+-+-+-+-+-+-+-+-+-+-+-+-+-+-+-+-+-+-+-+-+-+-+-+-+
   |                        Sequence Number                        |
   +-+-+-+-+-+-+-+-+-+-+-+-+-+-+-+-+-+-+-+-+-+-+-+-+-+-+-+-+-+-+-+-+
   |                    Acknowledgment Number                      |
   +-+-+-+-+-+-+-+-+-+-+-+-+-+-+-+-+-+-+-+-+-+-+-+-+-+-+-+-+-+-+-+-+
   |  Data |           |U |A |P |R |S |F |                         |
   | Offset| Reserved  |R |C |S |S |Y |I |          Window         |
   |       |           |G |K |H |T |N |N |                         |
   +-+-+-+-+-+-+-+-+-+-+-+-+-+-+-+-+-+-+-+-+-+-+-+-+-+-+-+-+-+-+-+-+
   |           Checksum            |         Urgent Pointer        |
   +-+-+-+-+-+-+-+-+-+-+-+-+-+-+-+-+-+-+-+-+-+-+-+-+-+-+-+-+-+-+-+-+
   |                    Options                    |    Padding    |
   +-+-+-+-+-+-+-+-+-+-+-+-+-+-+-+-+-+-+-+-+-+-+-+-+-+-+-+-+-+-+-+-+
   |                             data                              |
   +-+-+-+-+-+-+-+-+-+-+-+-+-+-+-+-+-+-+-+-+-+-+-+-+-+-+-+-+-+-+-+-+
```

The acknowledgment is transferred in a standard TCP packet which may or may not contain a payload. The acknowledgment is indicated in the acknowledgment number field of the TCP header. In a TCP packet, each byte, also known as an octet, has a sequence number. The sequence number field of the TCP header contains the sequence number of the first byte of the payload, with each subsequent byte having a sequence number one higher than its predecessor. The acknowledgment number contains the sequence number of the next byte the node sending the packet should receive from the destination node. In practice, this will be the lowest sequence number for which all lower bytes have been contiguously received.

In networks such as the internet, which can carry TCP packets, a data packet rarely travels directly from the source to the destination node. Typically, the data packet will pass through several routers. Routers are devices which allow packets to be directed from the source to destination in a series of shorter hops. Note that several different devices such as switches and hubs perform similar but subtly different functions in a TCP network. For purposes of explanation all such devices will be referred to as routers. This architecture allows a TCP-IP network to be deployed in a hierarchical fashion. The hierarchy has the advantage that infrastructure can be concentrated in a manner in which each successive levels of the hierarchy consists of fewer, higher capacity links instead of having direct connections between each connected device such as is effectively done in the telephone network.

Figure 3:
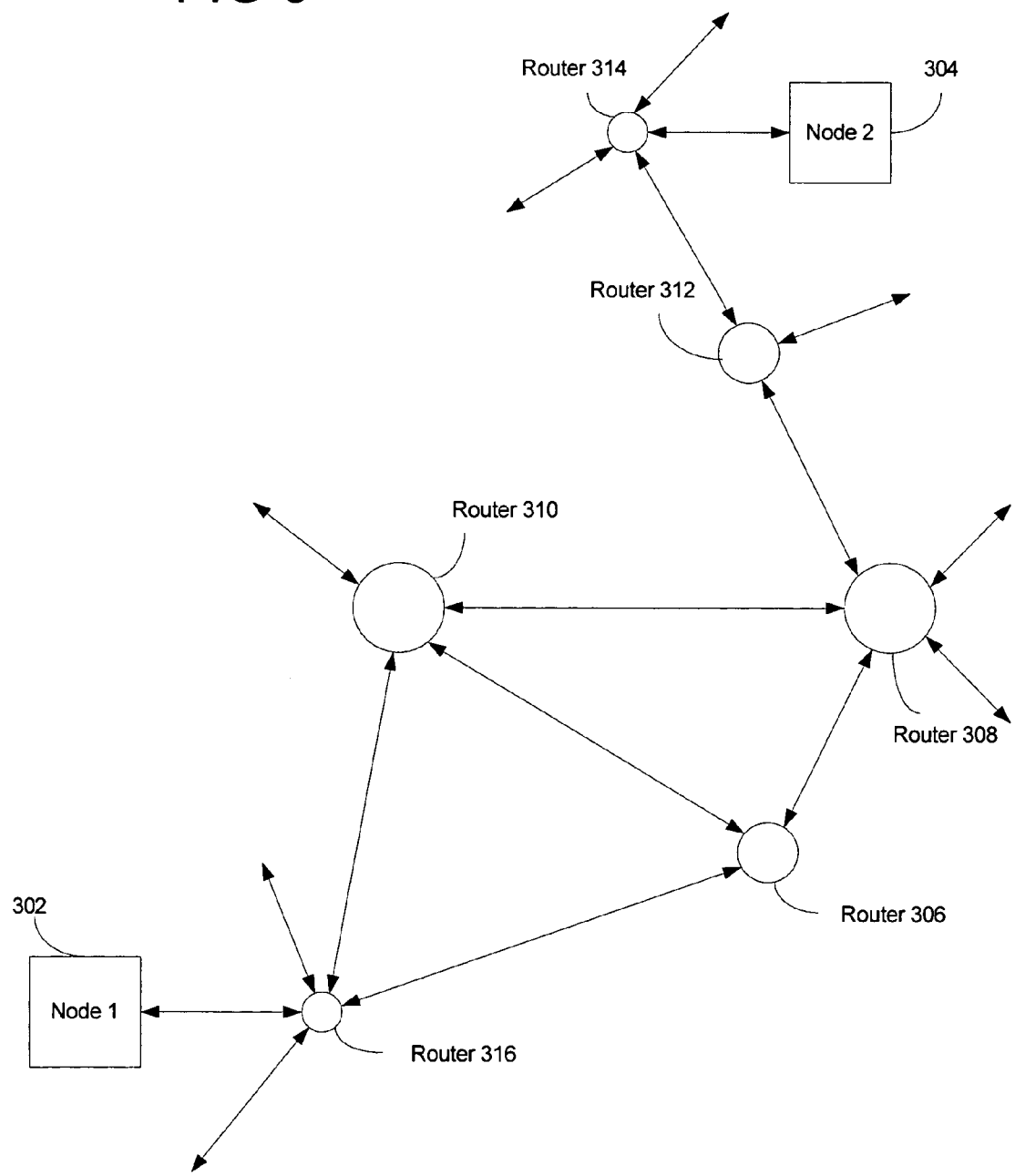
FIG. 3 is a block diagram of a typical network carrying TCP traffic.

The hierarchical nature of a typical network carrying TCP data is shown in FIG. 3. Consider a TCP packet transmitted from node 1, 302, and destined for node 2, 304. The packet can take one of several possible routes to travel from node 1 to node 2. The packet must first travel to router 316 as this is the only router to which node 1, 302, is connected. Router 316 is a local router which can, for example provide connectivity for several nodes in a single office. From router 316 the packet can, travel to router 306 or 310. The determination of which path to take relies on routing algorithms which attempt to minimize the transit time of the packet. Router 306 covers a larger area than router 316 and may for example be a part of an internet service provider which provides internet access to substantial number of homes and businesses. Router 310 covers a larger area than router 306 and may for example be a part of a backbone fiber optic network providing connectivity between large cities. Assume the packet traveled from router 316 to router 306 and then to router 310. From router 310, the packet will travel to router 308 then to router 312 and on to router 314 where router 308 is comparable in scope to router 310, router 312 is comparable in scope to router 306, and router 314 is comparable in scope to router 316. Note that a packet traveling in the reverse direction from node 2 (304) to node 1 (302) may or may not transverse the same path in reverse order. The additional paths shown from each router 306-316 are present to indicate that a single router is likely connected to multiple nodes and additional routers. Connections to routers and nodes are usually bidirectional, carrying data both into and from the router or node. The connections take several physical forms, for example, fiber optic, wired, and wireless connections and involve many lower layer protocols such as Cellular Packet Data Protocol (CPDP) in cellular, 802.11b, Ethernet, and 802.3.

The hierarchical nature of TCP-IP networks leads to a problem. It is possible that a given router can receive more data traffic than can be retransmitted. Typically, routers have some memory in which arriving packets are stored. For some period, if packets arrive faster than it is possible to retransmit these packets, the arriving packets are simply stored in this memory. However, this memory is necessarily limited and if the situation in which the packet arrival rate exceeds the rate of packet retransmission, eventually the memory will become full. Once the memory is full, any subsequently arriving packets are simply discarded. In a TCP-IP network, dropping packets does not necessarily prevent the eventual arrival of the packet as the sending node will eventually retransmit the lost packet as described in greater detail below. The situation in which a router is discarding packets because the packet arrival rate exceeds the retransmission rate is termed congestion. While congestion does not necessarily prevent a packet from reaching the proper destination, the process of retransmission does greatly delay packet transfer. Further, there is a limit on the number of times the sending node will attempt to retransmit a packet before deciding that the connection no longer exists and giving up on the transfer.

Figure 4:
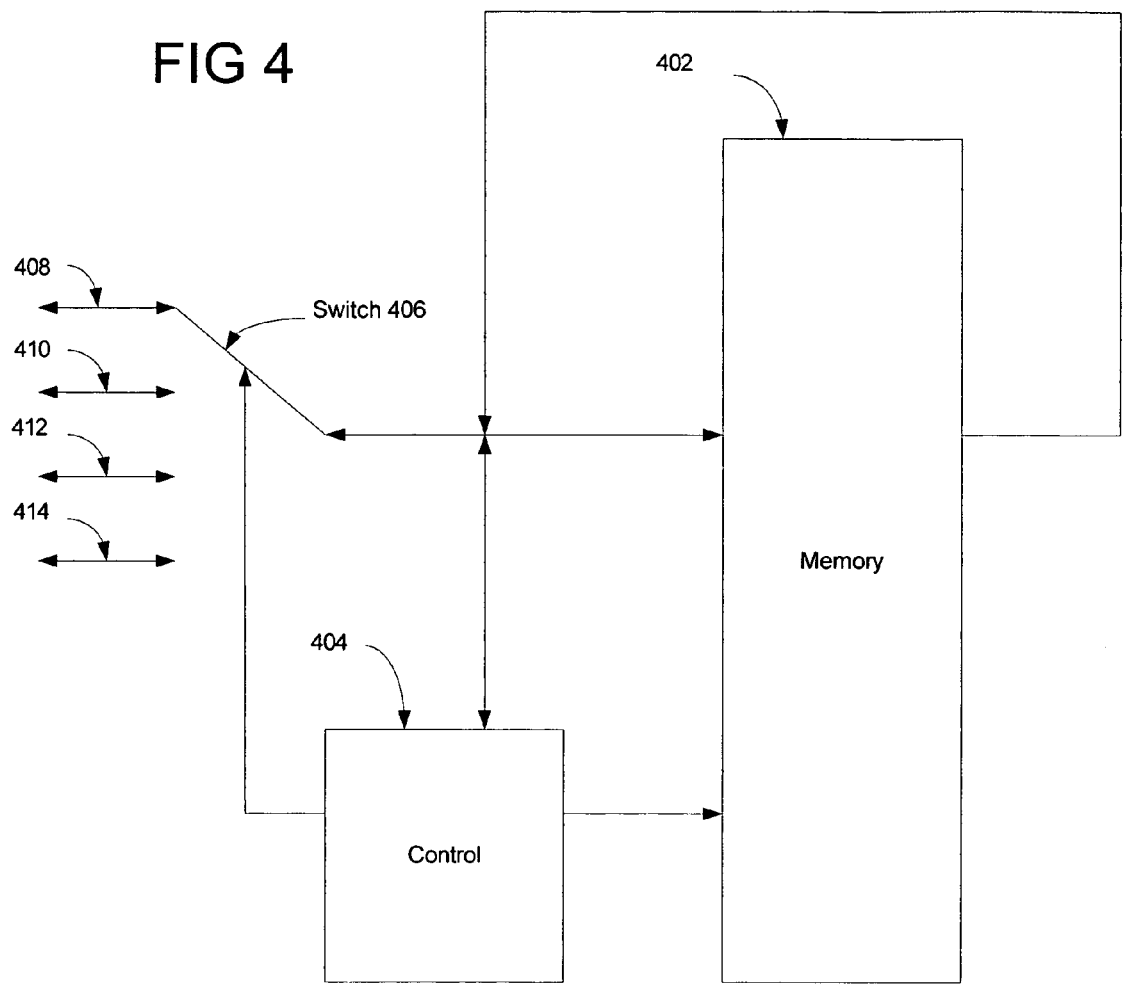
FIG. 4 is a block diagram of a simple router.

FIG. 4 shows a block diagram of a router. The router includes four input/output ports 408-414. Switch 406 selects which of these four ports 408-414 is attached to memory 402 at any given time. Each of ports 408-414 can be either an input or an output. When acting as an input, a packet will be transferred into memory 402; and when configured as an output, a packet will be transferred out of memory 402. Controller 404 selects the active port, examines the destination field of the TCP packet to determine the proper output port in conjunction with a routing algorithm, and controls the access to memory 402.

Figure 5:
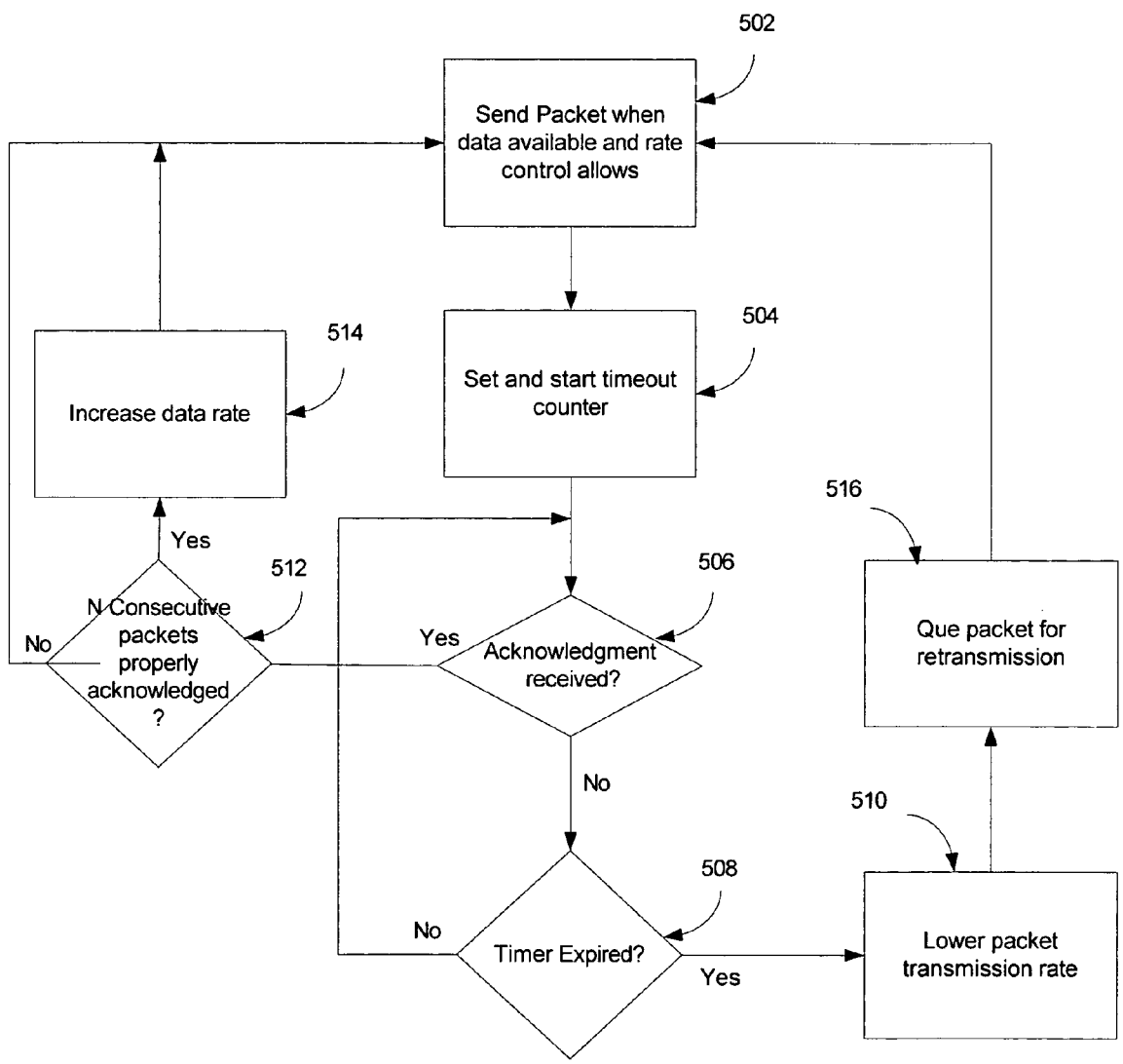
FIG. 5 is a flow diagram of the TCP congestion control algorithm.

The TCP protocol has mechanisms in place to attempt to mitigate congestion. The primary mechanism is to require that sending nodes lower the rate at which data is sent when packets are not acknowledged as illustrated in FIG. 5. In block 502, the sending node sends a packet. Block 504 directs that a timer is started which will run for a predetermined period. Block 506 directs that the sending node check for an acknowledgment of the packet sent in 502. If the acknowledgment has not arrived, the timer is checked in block 508. If the timer has not expired, control is returned to block 506. If the timer has expired, the maximum transmission rate is lowered in block 510. With the transmission rate lowered, the packet is set for retransmission in block 516. Control is returned to block 502 where the retransmission will take place. The transmission rate is lowered by requiring a delay before a new packet is sent.

In block 506, if an acknowledgment has been received, block 512 checks to ascertain if a predetermined number of packets, N, have been consecutively acknowledged. If N consecutive packets have been successfully acknowledged, the transmission rate is increased and control is passed to block 502. If less than N consecutive packets have been acknowledged, control is passed immediately to block 502.

When enough sending nodes transfer packets through the congested router with a slower rate of transmission, the rate at which packets are being received by the router will drop until the rate at which packets are being received is lower than the rate at which packets are being transmitted. When the rate of reception of packets drops below the rate of transmission, the router will no longer have to drop packets.

After the rate of packet transmission is decreased, the TCP-IP protocols will incrementally increase the transmission rate of packets if a predetermined period of time passes with no additional packets lost. In this manner, the protocol will cause the sending node to seek a point at which packet transmission rate is kept at a point at which few packets are dropped and transmission rate is maximized.

The TCP protocol guarantees the reliable delivery of packets by acknowledging packet delivery. It is not required that every packet be individually acknowledged. The acknowledgment method used in the TCP protocol used three fields defined in the TCP header shown in table 1. These fields are the sequence number, the acknowledgment number, and the window. The TCP protocol assigns a 32 bit number to each byte starting from the establishment of a connection between two nodes and incrementing for each byte sent from one node to another. Assume for descriptive purposes that data is being transferred from a first node to a second node. The sequence number is a number which identifies the first byte of a packet sent from a first node. The acknowledgment number is the number of the next byte the second node expects to receive. The window is the maximum number of bytes that the second node allows the first node to send without receiving an acknowledgment.

For purposes of example, assume the first node has received a first packet from the second node with an acknowledgment number of 1000 and a window of 750. The first node will send a second packet which begins with byte 1000 of length 500 bytes which contains bytes numbered 1000 through 1499. This packet will have a sequence number of 1000. The packet is legal to because the first node has knowledge that all bytes with sequence numbers less than 999 have been successfully received by the second node because of the acknowledgment number in the first packet. The first node can then send a third packet with a sequence number of 1500 and a length of 250 bytes containing bytes 1500 through 1749. At this point the first node cannot send any additional packets until an acknowledgment is received from the second node because the last packet received by the first node from the second node placed a limit at byte 1750 since the acknowledgment number plus the sequence number of the first packet is 1750.

Assume that the second packet was not received by the second node but the third packet was received. The second node will send a fourth packet with an acknowledgment number of 1000 and a window of 750. Note that this fourth packet can contain data as well if the second node has any data to send or it can simply be an acknowledgment. The acknowledgment number is still 1000 because the second node has not yet received byte 1000. At this point the first node can resend the second packet, again with a sequence number of 1000 and a length of 500. While in this example the retransmitted packet is the same length of the original packet, this is for example only and is not required by the TCP protocol. Upon reception of the retransmitted packet, the next packet sent by the second node will have an acknowledgment number of 1750. The acknowledgment number is now 1750 because the third packet has been received by the second node and therefore all bytes numbered less than 1750 have been successfully received.

In the above example, the loss of the packet will trigger a reduction of data rate at which the first node transmits packets due to congestion. The first node can determine in this case that the second packet was lost by examining the acknowledgment number of the fourth packet. However, consider a slightly different situation in which the fourth packet was also lost. In this situation, the first node will not transmit any additional packets because the first node has not received an acknowledgment of the second and third packets and the node has reached the end of the window defined by the first packet. On the other hand, the second node will not send more acknowledgments because it has not received any more data packets. If no further action is taken, data transfer would be deadlocked.

The solution to the deadlock in the TCP protocol is to place a timeout on the reception of an acknowledgment. When a packet is sent, the sending node starts a timer. When this timer reaches a predetermined value without the packet being acknowledged, the packet is assumed to be lost and is retransmitted. The assumption that the packet was lost necessitates that the sending node reduce the transmission rate to control congestion.

Retransmission Timeout works very well in a wired network wherein the network conditions are rather stable. However, in a wireless network, the network delay may vary dramatically and in some cases, the Retransmission Timeout can fire prematurely, or spuriously, when the packets are just delayed in the network while not lost. This sort of timeout is referred as Spurious Timeout (STO). In this situation, since no congestion occurs, reducing the sending rate is not an appropriate response.

If a node is aware that a wireless link exists in the packets path, it would be desirable to detect if the RTO is really due to losses of packets or network congestion. Although no mechanism exists within TCP to detect spurious timeouts, it is possible to detect so without modifying the TCP protocol.

Consider the situation in which the sending node is a wireless device, for example a cellular phone. In this case, the sending node knows that a wireless link is in use. Assume that the sending node has sent a TCP packet with a sequence number of 1000 and a length of 500 bytes and that no acknowledgment has been received with an acknowledgment number of greater than 1000 within the timeout period. At this point, the sending node does not know whether the sent packet was lost or if it is was delayed in some intermediate router.

In a typical TCP transaction, the sending node would retransmit the entire packet. Thus, when an ACK returns, the TCP sender cannot tell whether the ACK is generated by the first transmission or the retransmission, since in both cases, the content of the ACK is identical. This is also known as "Retransmission Ambiguity". To be conservative, the TCP protocol would lower the transmission rate of the sending node for congestion control.

To detect spurious timeouts, Retransmission Ambiguity must be removed. To do so, after a Retransmission Timeout, the sending node can retransmit a slightly shorter packet. The sending node may, for example, send a packet with an length of 499 bytes and again the sequence number will be 1000. If the receiving node has correctly received the original packet, the receiving node should respond with an acknowledgment containing an acknowledgment number of 1500 or greater. The acknowledgment number may be greater if additional packets contain bytes with sequence numbers of 1500 and greater had been transferred. If the receiving node did not receive the original packet correctly, it has not yet received byte 1499 and should respond with an acknowledgment number of 1499. Therefore, if the acknowledgment number is 1499 the sending node has determined that the receiving node did not properly receive the first packet while an acknowledgment number of 1500 or greater indicates that the original packet was received correctly and therefore the timeout just experienced is a spurious one. Note that this determination was made with no modifications to the TCP protocol.

When a spurious timeout is detected as described above, the sending node can take appropriate congestion control processes as is known in the art. This may require a modification to the standard TCP protocol but only requires that the transmission portion of the TCP protocol be modified. Further, nodes so modified will function even if no modifications to the receiving node have been implemented. Finally, this method of spurious timeout detection does not require any overhead in the sense that no modifications or additions to the TCP header options for a TCP packet are necessary.

Figure 6:
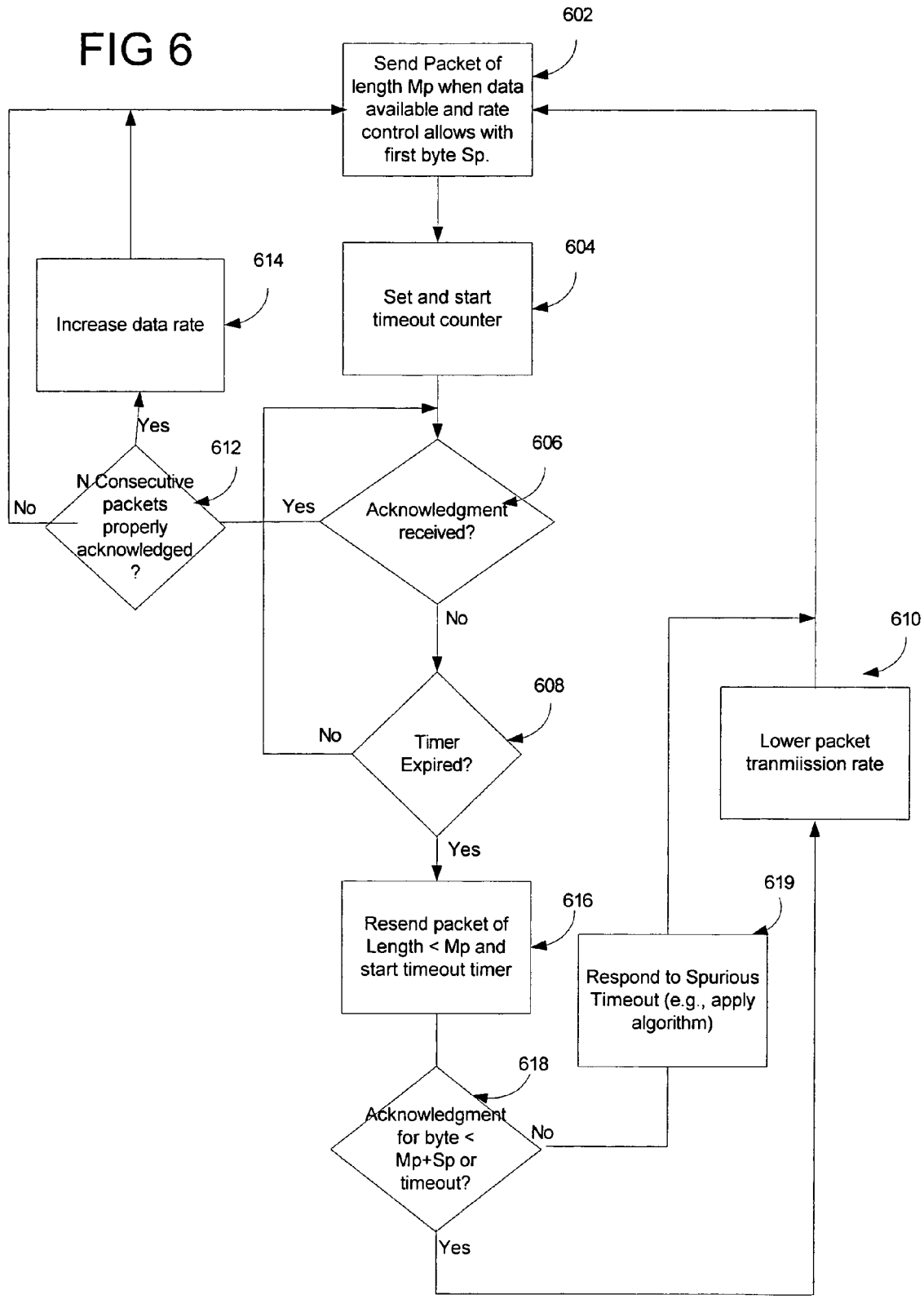
FIG. 6 is a flow diagram of the modified congestion control algorithm in accordance with the present invention.

FIG. 6 shows a flow diagram of the TCP protocol with spurious timeout detection. The figure is very similar to FIG. 5 except for the addition three blocks to perform the test for spurious timeouts and the removal of the block 516. In block 602, a packet is sent by a sending node of length Mp with the sequence number of the first byte Sp. The subscript p is used to indicate that the length and sequence number potentially differ for each pass through the flow diagram. In block 604 a timer is started which will run for a predetermined period. In block 606 the sending node checks for an acknowledgment of the packet sent in 602. If the acknowledgment has not arrived, the timer is checked in block 608. If the timer has not expired, control is passed back to block 606.

In step 606, if an acknowledgment has been received block 612 checks to ascertain if a predetermined number of packets, N, have been consecutively acknowledged. If N consecutive packets have been successfully acknowledged, the transmission rate is increased and control is passed to block 602. If less than N consecutive packets have been acknowledged, control is passed immediately to block 602.

In block 608 if the timer has expired the packet is sent with the sequence number of the first byte of Sp and a length of less than Mp. Assuming an acknowledgment is received, the acknowledgment number is compared to Sp+Mp. If the acknowledgment number is less or equal to Sp+Mp then the timeout was due to a loss of the packet and the data rate is reduced in 610. If the acknowledgment number is greater than or equal to Sp+Mp then the timeout was spurious and some response algorithm can be applied in block 619. If the acknowledgment is not received in another timeout period, it is assumed that the packet loss was an actual packet loss and the rate is reduced. It is anticipated that a packet smaller than that sent in step 616 could also be sent and the spurious timeout procedure repeated. Smaller packets can continue to be transmitted until the packet size goes to zero though at some point the advantage of detecting the spurious timeout will be outweighed by the continual retransmission of smaller packets. Usually a limit on the number of times that a packet can retransmitted are enforced assuming that if a packet does not get acknowledged within a certain number of transmissions, then problems exist with the data link and the connection should be reset.

In view of the many possible embodiments to which the principles of this n can be applied, it will be recognized that the embodiment described herein with to the drawing figures is meant to be illustrative only and are not be taken as the scope of invention. For example, those of skill in the art will recognize that the elements of the illustrated embodiment shown in software can be implemented in e and vice versa or that the illustrated embodiment can be modified in arrangement and detail without departing from the spirit of the invention. Therefore, the n as described herein contemplates all such embodiments as can come within the scope of the following claims and equivalents thereof.

We claim:

1. A method for detecting a spurious timeout in a computer network by a packet transmitting node, the method comprising:
   detecting a time-out of an expected acknowledgment of a first sent packet sent by the transmitting node;
   sending a second packet which is a shortened version of the first packet;
   receiving an acknowledgment, the acknowledgment including a sequence number of an earliest data segment not yet received by a receiving node; and
   testing the sequence number of the lowest numbered data segment not yet received to determine if the first packet was received by the receiving node.

2. The method of claim 1 wherein the shortened version is at least one byte shorter than the first packet.

3. The method of claim 1 wherein at least one of the transmitting and receiving node is connected to the computer network via a wireless connection.

4. The method of claim 1 wherein the first and second packet comply with the TCP protocol.

5. The method of claim 1 wherein each data segment in a packet has an associated sequence number.

6. The method of claim 1 wherein the sequence number of the acknowledgment contains the sequence number of the lowest numbered data segment not yet received by the receiving node.

7. The method of claim 1 wherein the testing of the sequence number includes comparing the sequence number received in the acknowledgment to a plurality of sequence numbers of last data segments transmitted in the first and second packets.

8. The method of claim 7 wherein the testing further includes comparing the sequence number received in the acknowledgment with the sequence number of the last data segment of the first packet to determine whether the sequence number received in the acknowledgment is greater.

9. The method of claim 7 wherein a spurious timeout is detected if the sequence number contained in the acknowledgment is greater than the sequence number of the last data segment of the first packet.

10. The method of claim 1 wherein the data segment is an octet.

11. The method of claim 1 wherein rate adaptation is not performed upon detection of a spurious timeout.

12. A computer readable medium holding computer readable code executing by a computer for performing acts for detecting a spurious timeout in a computer network by a packet transmitting node, the method comprising:
- detecting a time-out of an expected acknowledgment of a first sent packet sent by the transmitting node;
- sending a second packet which is shorter in length than the first sent packet;
- receiving an acknowledgment, the acknowledgment including a sequence number of an earliest data segment not yet received by a receiving node; and
- testing the sequence number of the lowest numbered data segment not yet received to determine if the first packet was received by the receiving node.

13. The computer readable medium of claim 12 wherein the first and second packet comply with the TCP protocol.

14. The computer readable medium of claim 12 wherein each data segment in a packet has an associated sequence number.

15. The computer readable medium of claim 12 wherein the sequence number of the acknowledgment contains the sequence number of the lowest numbered data segment not yet received by the receiving node.

16. The computer readable medium of claim 12 wherein the testing of the sequence number includes comparing the sequence number received in the acknowledgment to a plurality of sequence numbers of last data segments transmitted in the first and second packets.

17. The computer readable medium of claim 16 wherein the testing further includes comparing the sequence number received in the acknowledgment with the sequence number of the last data segment of the first packet to determine whether the sequence number received in the acknowledgment is greater.

18. The computer readable medium of claim 16 wherein a spurious timeout is detected if the sequence number contained in the acknowledgment is greater than the sequence number of the last data segment of the first packet.

19. The computer readable medium of claim 12 wherein the data segment is an octet.

20. The computer readable medium of claim 12 wherein rate adaptation is not performed upon detection of a spurious timeout.

21. A computer system configured to act as a node complying with a TCP protocol, the computer system comprising:
- a processor;
- a memory coupled to the processor;
- a module coupled to the processor, the module configured to direct transmission of a shortened packet upon detection of a timeout of a prior packet, the module configured to examine a next acknowledgment to determine if a spurious timeout occurred, the acknowledgment including a sequence number of an earliest data segment not yet received by a receiving node, the module configured to test the sequence number of the lowest numbered data segment not yet received to determine if the first packet was received by the receiving node, the module configured to prevent a lower rate of data transmission if the module determines that a spurious timeout occurred.

22. The computer system of claim 21 wherein each data segment in a packet has an associated sequence number.

23. The computer system of claim 21 wherein the sequence number of the acknowledgment contains the sequence number of the lowest numbered data segment not yet received by the receiving node.

24. The computer system of claim 21 wherein the module is configured to compare the sequence number received in the acknowledgment to a plurality of sequence numbers of last data segments transmitted in the prior packet and the shortened packet.

25. The computer system of claim 24 wherein the module is configured to compare the sequence number received in the acknowledgment with the sequence number of the last data segment of the prior packet to determine whether the sequence number received in the acknowledgment is greater.

26. The computer system of claim 24 wherein a spurious timeout is detected if the sequence number contained in the acknowledgment is greater than the sequence number of the last data segment of the prior packet.

27. The computer system of claim 24 wherein the module is contained in a network interface card, the module configured for a wireless computer system.

* * * * *